United States Patent [19]

Ferrari

[11] 4,325,395
[45] Apr. 20, 1982

[54] DEVICE FOR CLEANING ROTARY DRUMS, IN PARTICULAR FOR ROTARY DRUM FILTERS

[75] Inventor: Gaetano Ferrari, Parma, Italy

[73] Assignee: Indracos S.r.l., Parma, Italy

[21] Appl. No.: 210,366

[22] Filed: Nov. 25, 1980

[30] Foreign Application Priority Data

Dec. 4, 1979 [IT] Italy .................. 29018/79[U]

[51] Int. Cl.³ .................. B08B 3/02; B08B 9/08
[52] U.S. Cl. .................. 134/152; 134/153
[58] Field of Search .................. 134/138–139, 134/144, 149, 152–153, 167 R–168 R, 172, 198

[56] References Cited

U.S. PATENT DOCUMENTS

| | | | |
|---|---|---|---|
| 3,062,227 | 11/1962 | Soderberg | 134/153 X |
| 3,070,103 | 12/1962 | Pickard | 134/153 X |
| 3,203,437 | 8/1965 | Faust | 134/152 X |
| 3,442,273 | 5/1969 | Hanish et al. | 134/152 X |
| 3,606,897 | 9/1971 | Tobin et al. | 134/152 X |
| 3,688,785 | 9/1972 | Stevens et al. | 134/138 |

Primary Examiner—Robert L. Bleutge
Attorney, Agent, or Firm—Browdy and Neimark

[57] ABSTRACT

This invention concerns an improved device for cleaning rotary drums, in particular for rotary drum filters. Such device substantially comprises a first tube, functioning as a guide, which is fixed to the inside of the rotary drum; the first tube is provided with a slit along its entire length. A second tube slides within the first tube, with a nozzle at one end, arranged perpendicularly to the two tubes, and which protrudes from said slit. The other end of the second tube is connected to a source of fluid under pressure.

3 Claims, 3 Drawing Figures

U.S. Patent    Apr. 20, 1982    4,325,395
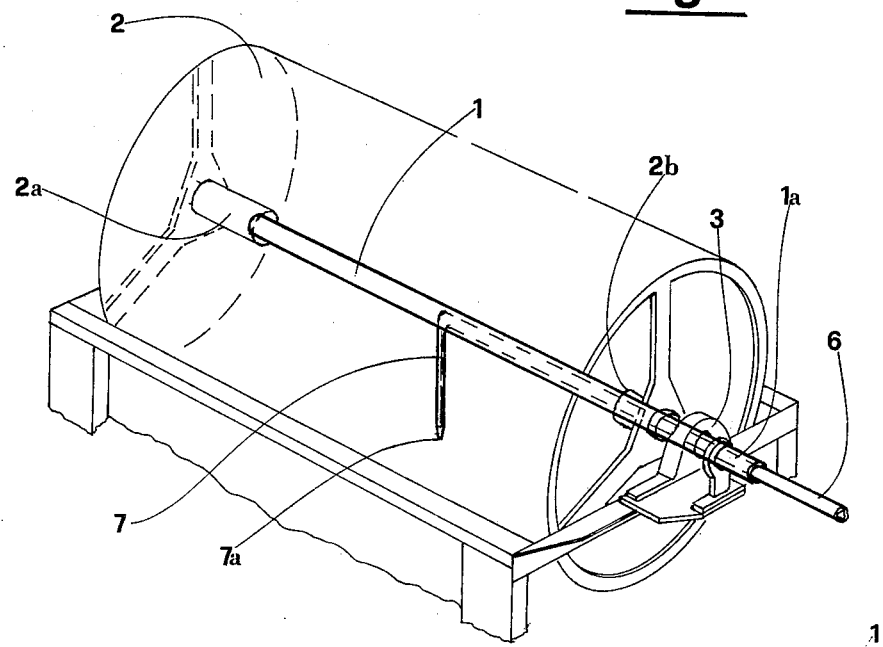
Fig.1
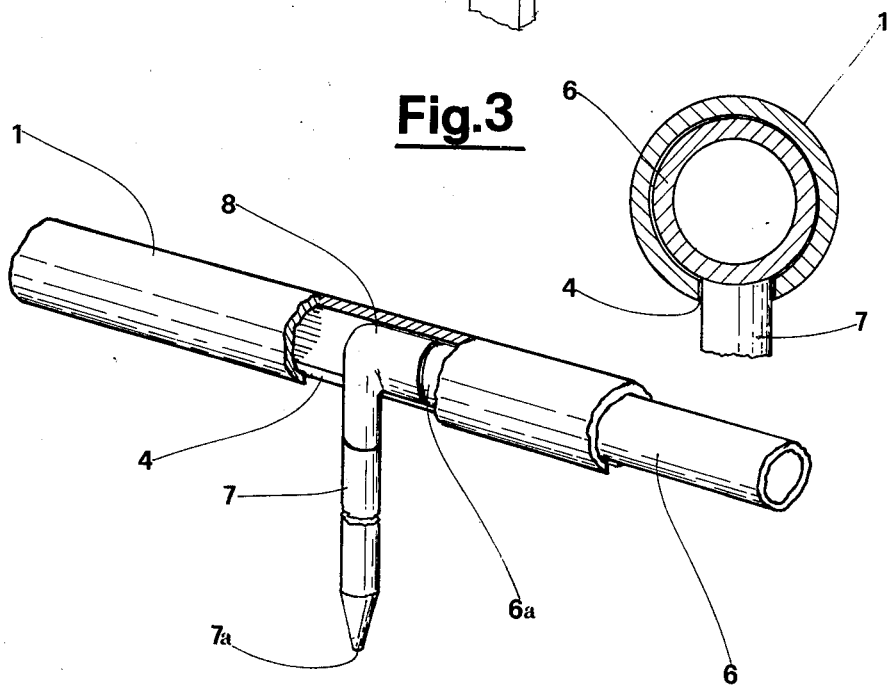
Fig.2
Fig.3

DEVICE FOR CLEANING ROTARY DRUMS, IN PARTICULAR FOR ROTARY DRUM FILTERS

The object is this invention is an improved device for cleaning rotary drums, in particular for rotary drum filters. Rotary drum filters are generally used for separating solid matter in suspension in liquids.

The suspension is poured onto the rotary drum of the filter: the liquid passes through the apertures in the drum and is discharged into the lower part of the drum itself whereas the solid matter remains on the outer surface of the drum from which it is removed by scraping, brushing or by other equivalent systems.

The apertures in the drum are susceptible to clogging by the solid matter and must therefore be cleaned quite frequently. This operation is carried out by a known device, fixed to the inside of the drum equipped with a plurality of nozzles, situated close to the inner surface of the drum, which spray water or other liquids under pressure as required onto the apertures in the drum itself, thus freeing them of any solid matter which may be lodged in the aforementioned apertures.

If, in order to clean the drum thoroughly, the pressure of the water must be increased, this device, which presents the considerable inconvenience of requiring a very large supply of water, must be provided with a rather cumbersome and very expensive pump.

An aim of this invention is to overcome the aforementioned problems by providing a device for cleaning said drums which does not require a large supply of water and therefore, cumbersome and expensive pumps.

A further aim of this invention is to provide an extremely simple, cheap, highly functional and reliable device for cleaning rotary drums.

These and still further aims are achieved by the device in question, characterized by the fact of comprising: a guide, fixed with respect to said drum, situated within the drum itself, said guide being of a length approximately equal to the length of the drum itself; a cursor sliding along said guide; a nozzle, integrally connected to said cursor, situated with its discharging orifice close to the inner surface of the drum; a duct, communicating with the discharging orifice of said nozzle, one of the ends of which protrudes from said drum and is connected to a source of fluid under pressure; suitable traversing means to slide said cursor along said guide.

Further features and advantages of this invention will appear more clearly from the following detailed description of a preferred but not exclusive embodiment of the device in question, which is shown merely by way of example and is in no way restrictive, in the annexed drawings in which:

BRIEF DESCRIPTION OF THE DRAWINGS

FIG. 1 shows schematically, in perspective view, the device in question, inserted in the rotary drum which is shown in phantom;

FIG. 2 shows, in perspective view, a detail of the device in question, with certain parts removed in order to reveal the others more clearly;

FIG. 3 shows, in large-scale, a straight section of the first tube constituting the guide for the device.

The device in question comprises a guide, consisting of a first cylindrical tube (1), fixed with respect to the drum (2) of the filter; such tube (1) is situated within the drum (2) parallel to the generatrix of the drum itself, and is of a length approximately equal to the length of the drum.

The tube (1) is held by the supports (2a) and (2b) within the drum and by the support (3) outside the drum, and is arranged coaxially to the drum (2). The tube (1) is moreover provided with a slit (4) cut parallel to the generatrix of the tube itself, which extends along the entire length of the tube; the tube (1) is arranged so that the slit (4) is facing downwards. The end (1a) of the tube (1), placed close to the support (3), protrudes from the drum (2) and is therefore accessible from the outside. The device in question is moreover provided with a cursor, sliding along said guide, comprising a second tube (6), with a smaller external diameter than the internal diameter of the first tube (1), which is inserted into the first tube itself. A nozzle (7) is integrally connected, by means of a union (8), to one end (6a) of the tube (6).

The nozzle (7), arranged with its axis perpendicular to the axis of the tube (6), protrudes from the slit (4) and is of such a length that its discharging orifice (7a) is situated close to the internal surface of the drum (2). When the tube (6) slides within the tube (1), the nozzle (7) slides in the slit (4); the length of the tube (6) is such that whatever the reciprocal position that the tubes (1) and (6) may assume during the sliding movement, the free end of the tube (6) always protrudes from the end (1a) of the tube (1): this occurs, in particular, even when the nozzle (7) is, with reference to FIG. 1, in the vicinity of the left end of the tube (1). The free end of the tube (6) is connected to a source of fluid under pressure (not shown in the figure). The inside of the tube (6) communicates with the discharging orifice (7a) of the nozzle (7), thus permitting the passage of fluid under pressure from said source, to the discharging orifice itself; the tube (6) serves therefore as a duct for carrying the fluid under pressure from the source to the discharging orifice of the nozzle.

In the embodiment shown in the figures, the sliding movement of the tube (6) within the tube (1) is achieved by means of manual thrust; in this embodiment the tube (6) is rigid; such tube may also be replaced by a flexible hose.

The device functions as described hereunder.

Whenever it is necessary to clean the apertures in the drum, a source of fluid (usually water) under pressure, is connected to the free ends of the tube (6) which, as mentioned previously, always protrudes from the drum, and the fluid is conveyed to the discharging orifice of the nozzle.

By rotating the drum and simultaneously sliding the tube (6) (and therefore, the nozzle (7)) back and forth through the tube (1), all the apertures on the drum are consequently hit by the jet of fluid which causes the expulsion, towards the outside, of the solid matter clogging the apertures themselves. The volume of fluid discharged from the nozzle is very small, therefore the source of fluid under pressure may consist of small and inexpensive pumps.

The traversing speed of the tube (6), which may also be operated with discontinuous movement, must be proportional to the speed of rotation of the drum, so that the nozzle does not change its position excessively before the drum has made at least one complete turn; in this way, all the apertures in the drum will be reached by the fluid discharged from the nozzle.

Numerous modifications of a practical applicational nature may be made to the constructional details without however deviating from the sphere of protection of the inventive concept as hereinunder claimed.

I claim:

1. Improved device for cleaning rotary drums, in particular for rotary drum filters, characterized by the fact of comprising: a guide, fixed with respect to said drum (2), situated within the drum and parallel to the generatrix of the drum itself, said guide being of a length approximately equal to the length of the drum; a cursor, sliding along said guide; a nozzle (7), integrally connected to said cursor, situated with its discharging orifice close to the inner surface of said drum; a duct, communicating with the discharging orifice of said nozzle, one end of which protrudes from said drum and is connected to a source of fluid under pressure; and traversing means for sliding said cursor along said guide.

2. Device as claimed in claim 1, characterized by the fact that said guide comprises a first cylindrical tube (1), situated coaxially to said drum, provided with a slit (4) cut parallel to the generatrix of said first tube and extending along the entire axial length of the first tube itself, at least one end of said first tube being accessible from the outside of said drum.

3. Device as claimed in the previous claims, characterized by the fact of comprising a second tube (6), with a smaller external diameter than the internal diameter of said first tube, at one end of which is integrally connected, with an axis approximately perpendicular to the axis of said second tube, said nozzle (7), said second tube being inserted into said first tube, in such a way that the nozzle protrudes from said slit, and being of such a length that its free end protrudes, whatever be the mutual position of said first and second tube, from said end accessible from the outside, of the first tube; said second tube functioning both as said cursor and as said duct.

* * * * *